United States Patent
Baumgartner

(10) Patent No.: US 7,346,984 B2
(45) Date of Patent: Mar. 25, 2008

(54) LIGHT METAL WHEEL

(75) Inventor: Heinrich Baumgartner, Schiltach (DE)

(73) Assignee: BBS Motorsport & Engineering GmbH, Schiltech (DE)

( * ) Notice: Subject to any disclaimer, the term of this patent is extended or adjusted under 35 U.S.C. 154(b) by 0 days.

(21) Appl. No.: 10/894,155

(22) Filed: Jul. 19, 2004

(65) Prior Publication Data
US 2004/0251735 A1 Dec. 16, 2004

Related U.S. Application Data

(63) Continuation of application No. 10/070,578, filed on Jul. 24, 2002, now Pat. No. 6,783,190.

(51) Int. Cl.
*B23P 17/00* (2006.01)
*B21K 1/38* (2006.01)
*B60B 3/10* (2006.01)

(52) U.S. Cl. .............................. 29/894.324; 29/894.35; 301/64.102

(58) Field of Classification Search .............................. 301/64.101–64.102, 64.201, 64.203, 64.302, 301/65, 95.104, 95.105, 95.106, 95.109, 301/64.5; 152/379.4, 379.5, 381.4, 349.4–349.5; 29/894.32, 894.322, 894.324, 894.35
See application file for complete search history.

(56) References Cited

U.S. PATENT DOCUMENTS

| | | | |
|---|---|---|---|
| 1,809,605 A * | 6/1931 | Sauzedde ............... | 29/894.354 |
| 2,083,326 A * | 6/1937 | Eksergian ................... | 301/5.1 |
| 2,825,961 A * | 3/1958 | Woodward ............. | 29/894.353 |
| 3,228,097 A * | 1/1966 | Tucker .................. | 29/894.354 |
| 3,549,205 A * | 12/1970 | Reid ........................... | 301/65 |
| 3,822,458 A * | 7/1974 | Schulte et al. ......... | 29/894.324 |
| 5,641,208 A * | 6/1997 | Stach .................... | 301/64.102 |
| 5,794,340 A * | 8/1998 | Pollkotter ............. | 29/894.324 |
| 5,832,608 A * | 11/1998 | Pollkotter ............. | 29/894.324 |
| 6,024,415 A * | 2/2000 | Stach .................... | 301/64.102 |
| 6,231,129 B1 * | 5/2001 | Stach ......................... | 301/65 |
| 6,234,581 B1 * | 5/2001 | Stach .................... | 301/64.102 |
| 6,312,059 B1 * | 11/2001 | Stach ......................... | 301/65 |
| 6,427,328 B2 * | 8/2002 | Pollkoetter ............. | 29/894.324 |
| 6,769,743 B1 * | 8/2004 | Aasen et al. ........... | 301/63.104 |
| 6,783,190 B1 * | 8/2004 | Baumgartner .......... | 301/64.102 |

* cited by examiner

*Primary Examiner*—Jason R. Bellinger
(74) *Attorney, Agent, or Firm*—Wood, Phillips, Katz, Clark & Mortimer

(57) ABSTRACT

A wheel, particularly a light metal wheel, for motor vehicles, essentially consists of a spoke wheel center (20) and a rim (10). In order to reduce weight and increase the bending strength, which is of great significance in regard to contact with curbstones and potholes, profile segment (31) in the form of half-shell units, which forms a continuous hollow chamber (41) in the direction of the circumference, at least in sections, are provided in the area of an external base of the rim (14).

2 Claims, 11 Drawing Sheets

LIGHT METAL WHEEL

This is a Continuation, and claims the priority of the filing date, of Ser. No. 10/070,578, filed on Jul. 24, 2002 now U.S. Pat. No. 6,783,190 B1.

The invention relates to a wheel, particularly a light metal wheel for motor vehicles, wherein each such wheel comprises a spoke wheel center and a wheel rim, in which the wheel rim has an inner bead seat making a transition to an internal horn of the rim, and an outer bead seat making a transition into an external horn of the rim.

BACKGROUND OF THE INVENTION

1. The Technical Field

Such types of wheels enjoy very great popularity, particularly in a construction as light metal wheels, since, in addition to an increased overall aesthetic appearance of the motor vehicle, additional technical advantages can be attained.

2. The Prior Art

In entirely general terms, the present trend is towards reducing the weight of the wheel as much as possible. This is an additional reason for the increasing spread of light metal wheels. The savings in weight relative to conventional steel wheels that is achieved is frequently not very high, however, since the light metal alloys that are used mostly do not have the strength of steel. Such wheels must therefore be designed with greater wall thicknesses, as the result of which the weight advantage is partially lost again.

The task which forms the basis for the present invention is therefore that of further developing a wheel, particularly a light metal wheel for motor vehicles, in such a manner that it no longer has the disadvantages stated. In particular, a wheel should be created which permits an additional reduction of weight or an improvement of the mechanical characteristics relative to conventional wheels.

SUMMARY OF THE INVENTION

This problem is solved by means of a wheel which is provided with profile segments which continuously form at least one hollow chamber in the direction of the circumference, which profile segments, at least in sections, are provided in the area of the internal bead seat and the external bead seat.

Advantageous forms of implementation of the invention are stated herein.

The invention is based on the idea of forming hollow chambers in areas of the wheel that are subject to particularly heavy stresses, thus, in the area of the internal horn of the rim and the external horn of the rim.

These hollow chambers are comparable with closed hollow chamber profile sections, which are known entirely generally from the area of light construction and which permit a considerable increase in the strength. In concrete terms, it is provided to apply profile segments, which each form hollow chambers in the direction of circumference, in the area of the internal base of the rim and/or of the external base of the rim. As a general rule, the hollow chamber is developed continuously in the direction of circumference, so that an increase in rigidity, distributed optimally uniformly over the circumference, is provided. In the area of the internal horn of the rim, the increase in the bending strength is used to improve the so-called impact behavior. In the area of the external horn of the rim, the aspect of the weight reduction is most prominent.

One particularly weight-saving construction results if the hollow chamber assigned to the external base of the rim is combined with hollow chamber spokes. In this manner, a hollow chamber structure, which makes possible excellent rigidity values with simultaneously minimum weight, can be provided.

The construction of the hollow chambers is carried out by means of profile segments which are attached to the wheel rim in the area of the internal base of the rim or of the external base of the rim and are connected into a closed hollow profile.

One particularly simple construction results if the profile segments are developed as shell units, particularly as half-shell units. These can be pre-manufactured in a simple way and manner and, as a rule, applied to the external circumference of the wheel rim. The individual segments can be connected with one another by means of connection techniques which are known per se and have already proven their value, such as welding, adhesion, or flanging, for example. The connection is likewise carried out towards the wheel rim, so that a closed hollow chamber profile can be produced.

The geometrical configuration of the profile segments can be selected in such a manner that optimal results can be achieved in relation to the bending strength that is being striven for. As a rule, however, at least one section of the specific profile segments of the base of the rim—that is to say, the internal base of the rim or the external base of the rim—is configured so that the geometry is accordingly provided in those areas as a seat or supporting surface for the tires.

In accordance with one preferred variant, the profile segments are developed in a congruent manner in the area of the internal base of the rim and the profile segments in the area of the external base of the rim. They can consequently be stored in inventory as so-called identical parts, and permit optional application in the internal- or in the external area.

Finally, it is also possible to form the profile segments, by means of a non-cutting shaping process, from an annular bar integrally formed on the wheel rim, particularly one cast integrally in a single piece. So-called ductile materials, which can be transformed under cold conditions, or cast alloys, which can be transformed under warm conditions, are suited for this.

DETAILED DESCRIPTION OF THE INVENTION

Figure 1:
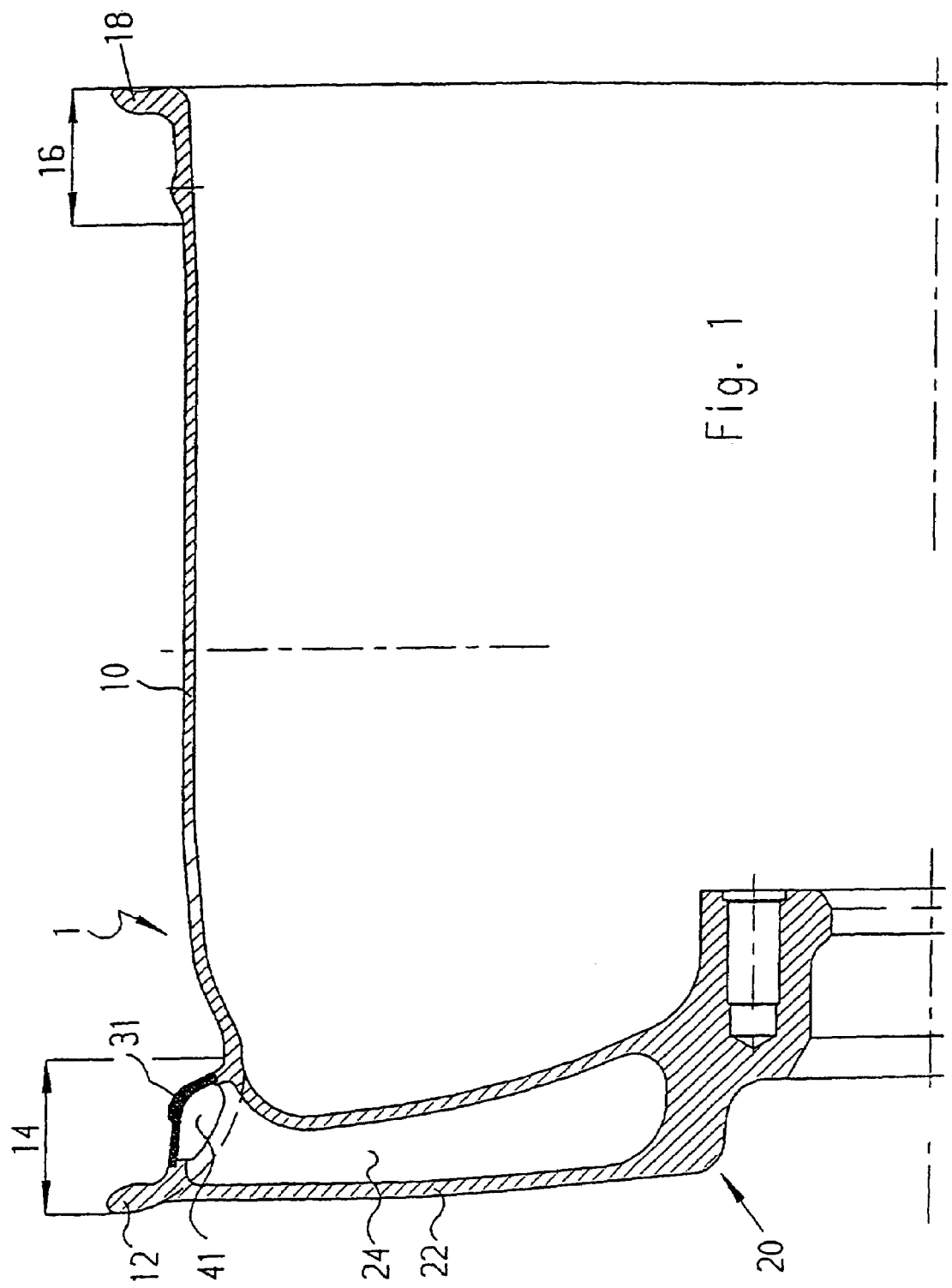
FIG. 1: Wheel in a half-section, first variant.

The wheel rim (10) has an internal base of the rim or bead seat (16) and an external base of the rim or bead seat (14). These each make a transition axially outwardly into an internal horn or flange of the rim (18) and an external horn or flange of the rim (12). A tire, not depicted here, which is seated on the internal base of the rim (16) and the external base of the rim (14), and is laterally applied on the internal horn of the rim (18) and the external horn of the rim (12), is held between the internal horn of the rim (18) and the external horn of the rim (12).

The wheel rim (10) makes a transition into a spoke wheel center (20), which has a multiplicity of spokes (22). The spokes (22) are, for reasons of weight savings, constructed as hollow spokes and each have a spoke hollow cavity (24). All variants of construction are accordingly in agreement.

Figure 2:
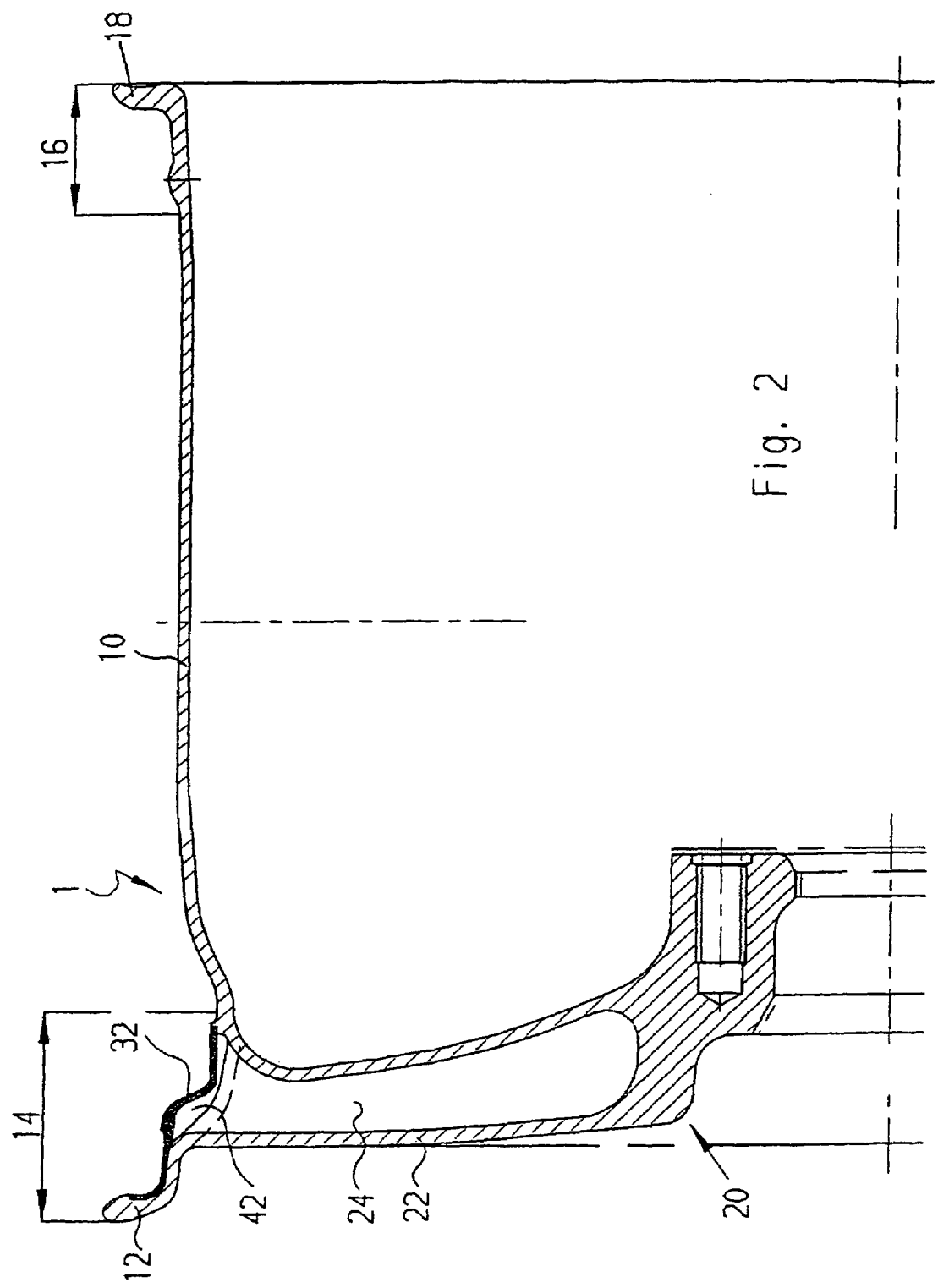
FIG. 2: Wheel in a half-section, second variant.
Figure 3:
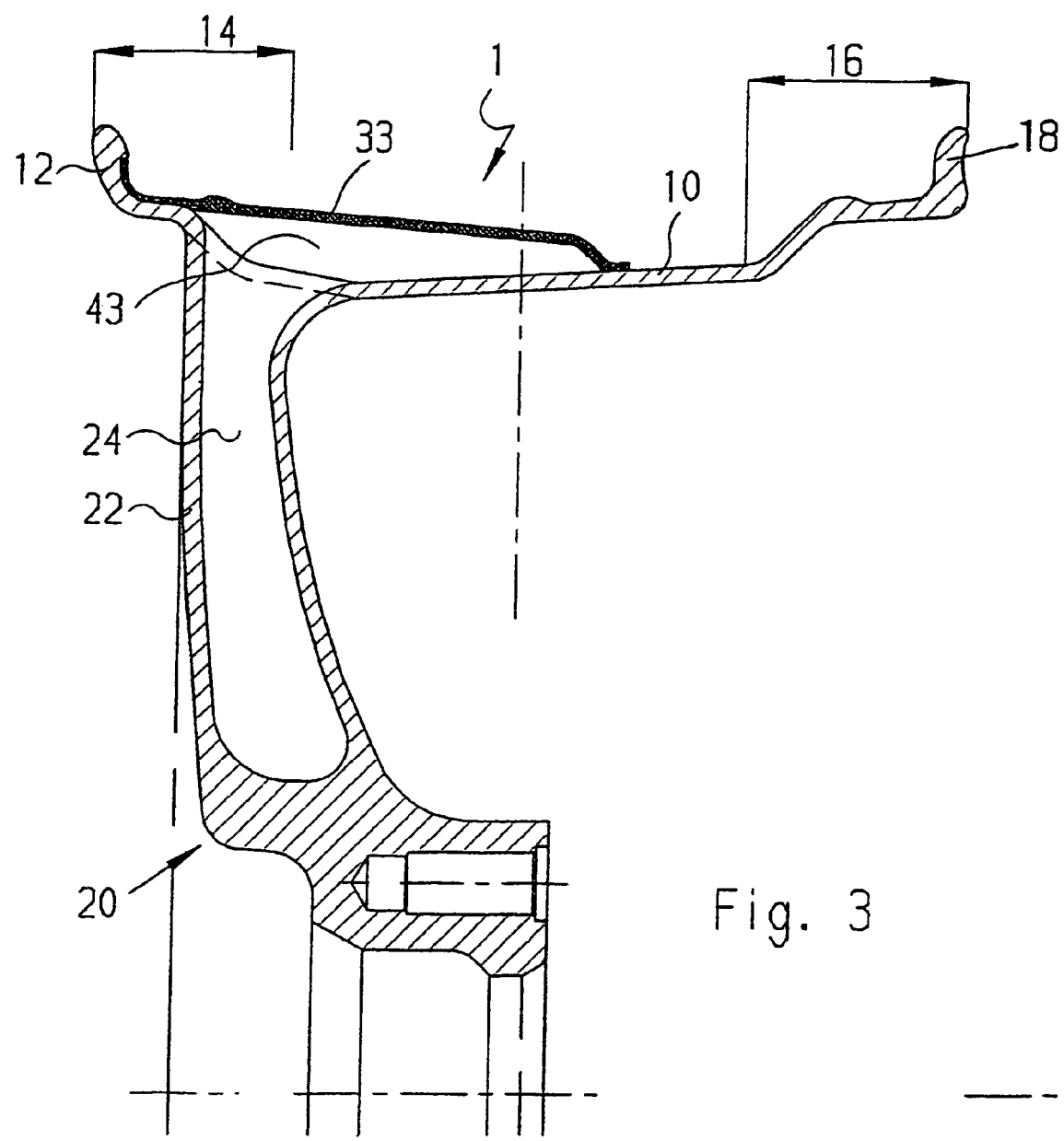
FIG. 3: Wheel in a half-section, third variant.

The variants of construction depicted in FIG. 1 to FIG. 3 have profile segments (31, 32, 33) which are attached in different configurations in the area of the external base of the rim (14). They each have the shape of half-shells, so that two profile segments (31, 32, 33) are each applied, from the outside, onto the wheel (1) in the area of the external base of the rim (14), and are connected solidly both with one another as well as well as with the wheel (1). In this way, a hollow cavity (41, 42, 43), which is configured continuously in the direction of circumference, is formed in the radial direction on the inside. A communicating connection with the spoke hollow cavities (24), through which an extremely stable and, at the same time, a rigid hollow chamber construction, is brought about, is present in the area of the spokes (22). This guarantees an impact behavior which is considerably improved in relation to the previously known contractions, which [impact behavior] is particularly important in regard to unintended curbstone contacts and driving over potholes. At the same time, this construction is very light, as the result of which the total weight of the wheel (1) is reduced considerably.

In the variant in accordance with FIG. 1, the profile segment (31) is configured in an essentially "L"-shape and is axially supported, on one end, on the external horn of the rim (12) and radially, on the other end, in the area of the spokes (22) proceeding outwardly.

Figure 9:
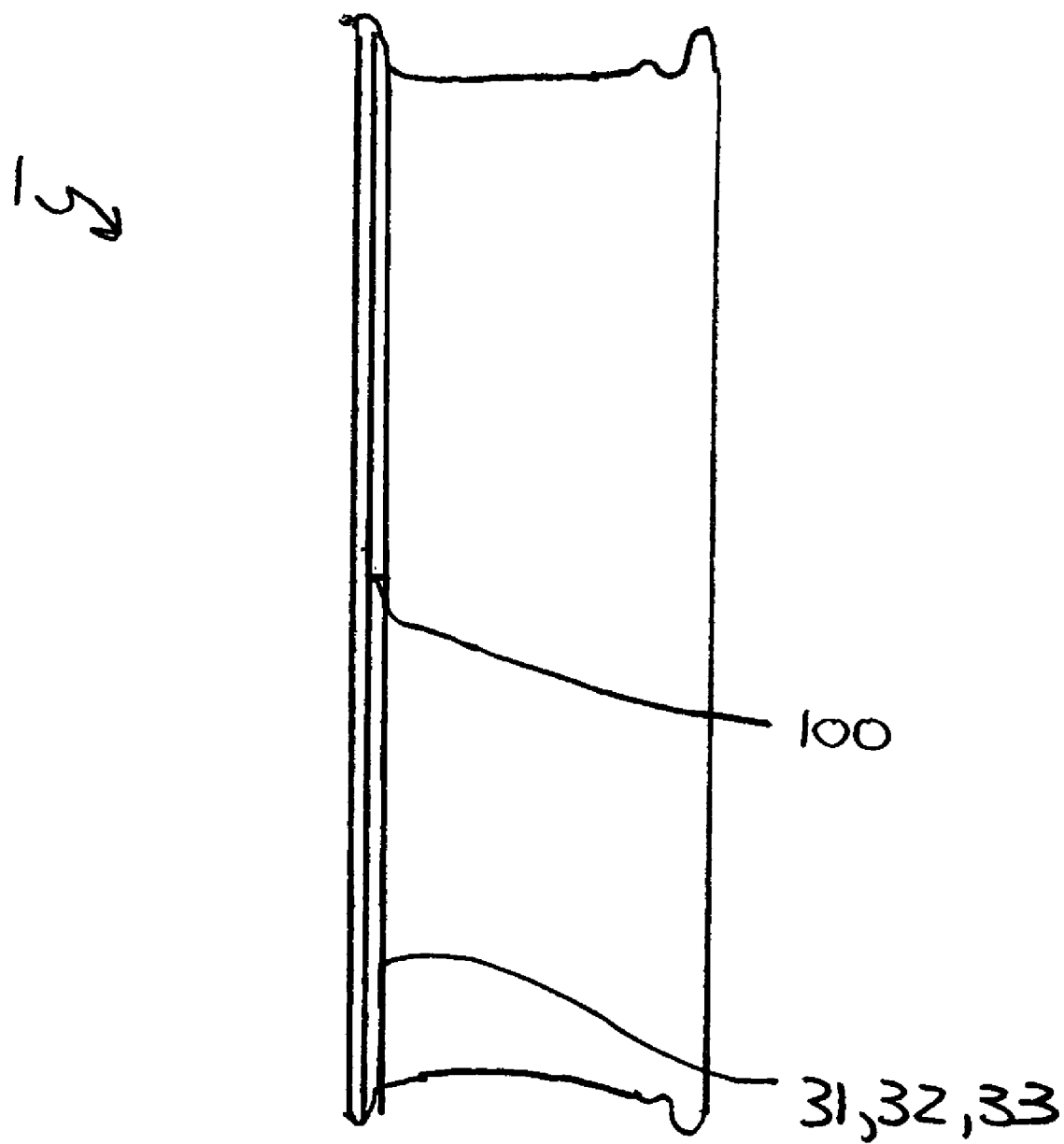
FIG. 9: A side elevation of a wheel according to preferred embodiments of the invention, showing how two profile segment half shells may be joined.

FIG. 9 is a side elevation of a wheel (1) showing how profile segment half shells (31, 32, 33) may be joined at 100, by means of any known method of joining, such as welding, adhesion or flanging.

In the variant of construction in accordance with FIG. 2, the profile segment (32) is beveled along a larger cross-sectional section on the external horn of the rim (12), over its complete surface. In this way, an optimal supporting of that area of the profile segment (32) which serves as tire seat is guaranteed.

The variant in accordance with FIG. 3 is primarily distinguished from that in accordance with FIG. 2 through the fact that the profile segment (33) is guided out beyond the middle axis of the wheel (1). In this way, a sharp increase in the bending strength is achieved.

Figure 4:
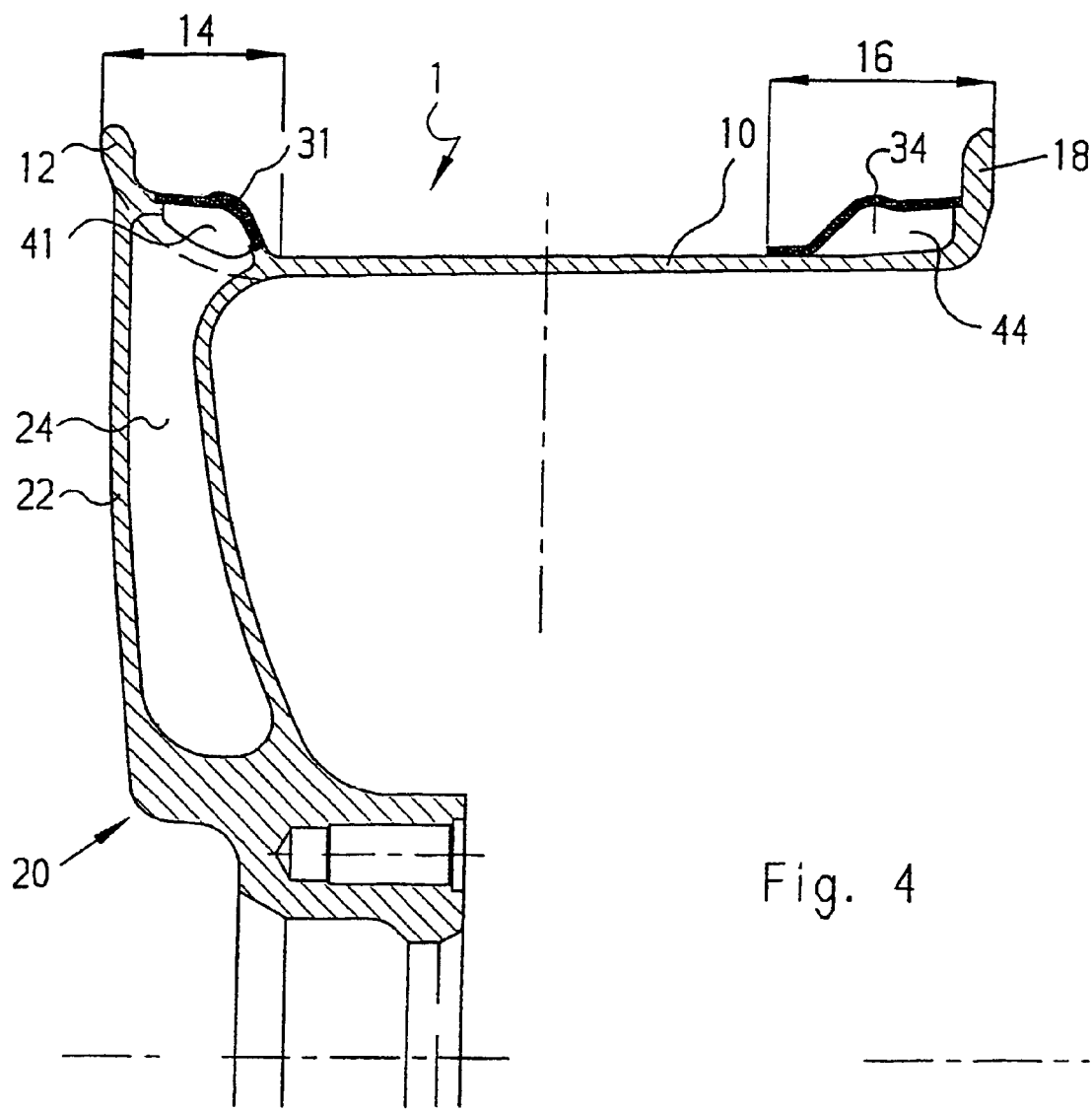
FIG. 4: Wheel in a half-section, fourth variant.
Figure 5:
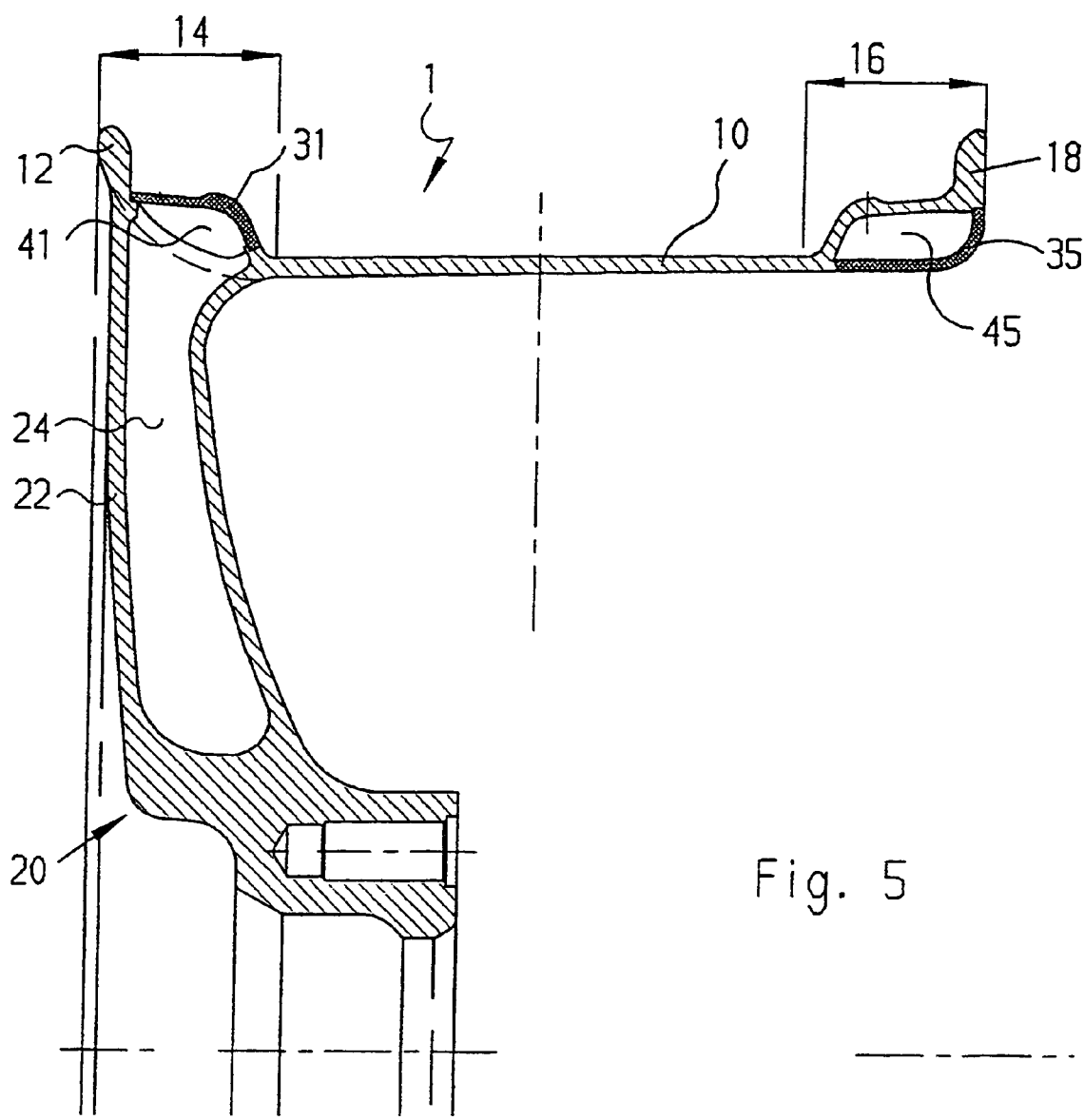
FIG. 5: Wheel in a half-section, fifth variant.
Figure 6:
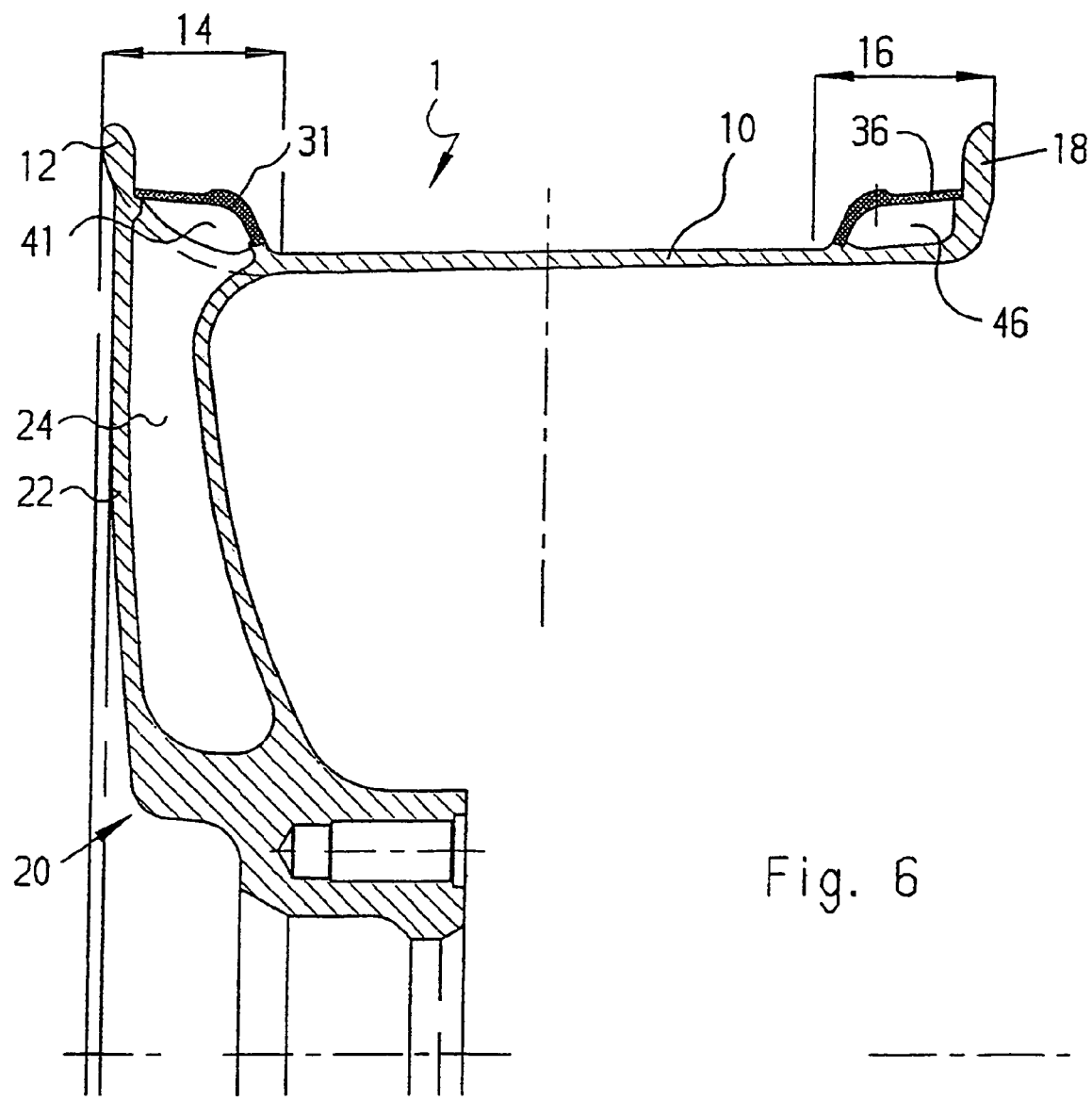
FIG. 6: Wheel in a half-section, sixth variant.

The variants of design in accordance with FIGS. 4 to FIG. 6 have a profile segment (31) which is in agreement with the variant of design in accordance with FIG. 1. In addition, profile segments (34, 35, 36), which each form additional hollow chambers (44, 45, 46), are provided in the area of the internal base of the rim (16). The profile segments (34, 35, 36) are, in turn, designed as half-shell units, which are solidly connected both with one another as well as with the wheel (1). They thereby increase the bending strength in the area of the internal horn of the rim (18), as the result of which the impact behavior is also decisively improved in this area. This is particularly important here in relation to driving over potholes.

In the variant of design in accordance with FIG. 4, the profile segments (34) are applied to be positioned radially and externally on the wheel (1) and form, together with the internal horn of the rim (18), the internal base of the rim (16). In the radial direction, the profile segments (34) support the tires directly. (1) and form, together with the internal horn of the rim (18), the internal base of the rim (16). In the radial direction, the profile segments (34) support the tires directly.

In the variant of design in accordance with FIG. 5, the profile segment (35) is provided positioned radially internally, and thereby serves exclusively for increasing the rigidity. The tire seat is additionally formed directly on the wheel rim (10).

FIG. 6 depicts a variant in which the profile segment (36) is designed to be congruent with the profile segment (31). This variant makes possible an identical design of the parts, since the profile segments (31, 36) can optionally be used in the area of the internal base of the rim (16) or of the external base of the rim (14).

Figure 7A:
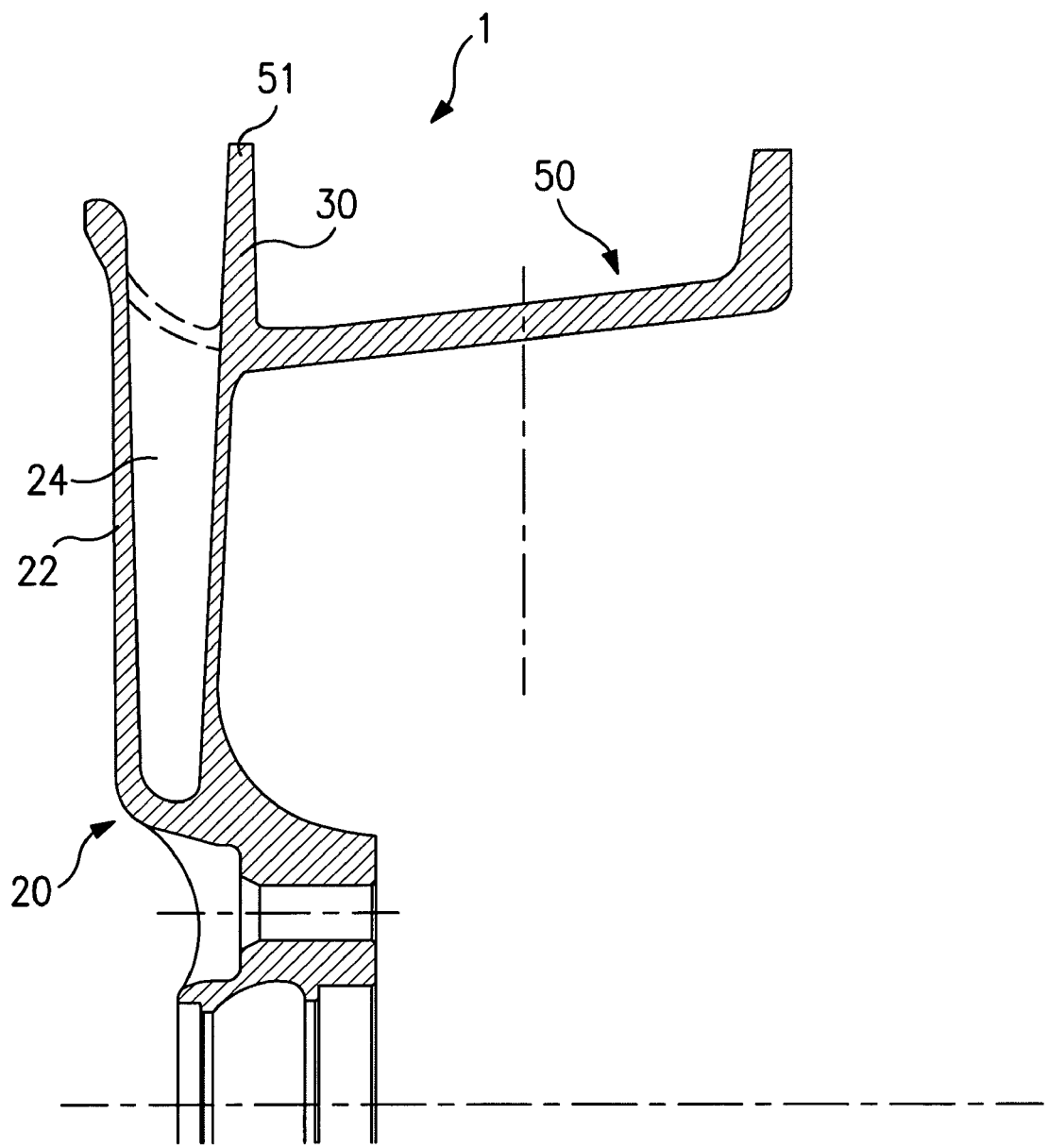
FIG. 7A is an illustration of the seventh variant in initial form.
Figure 7B:
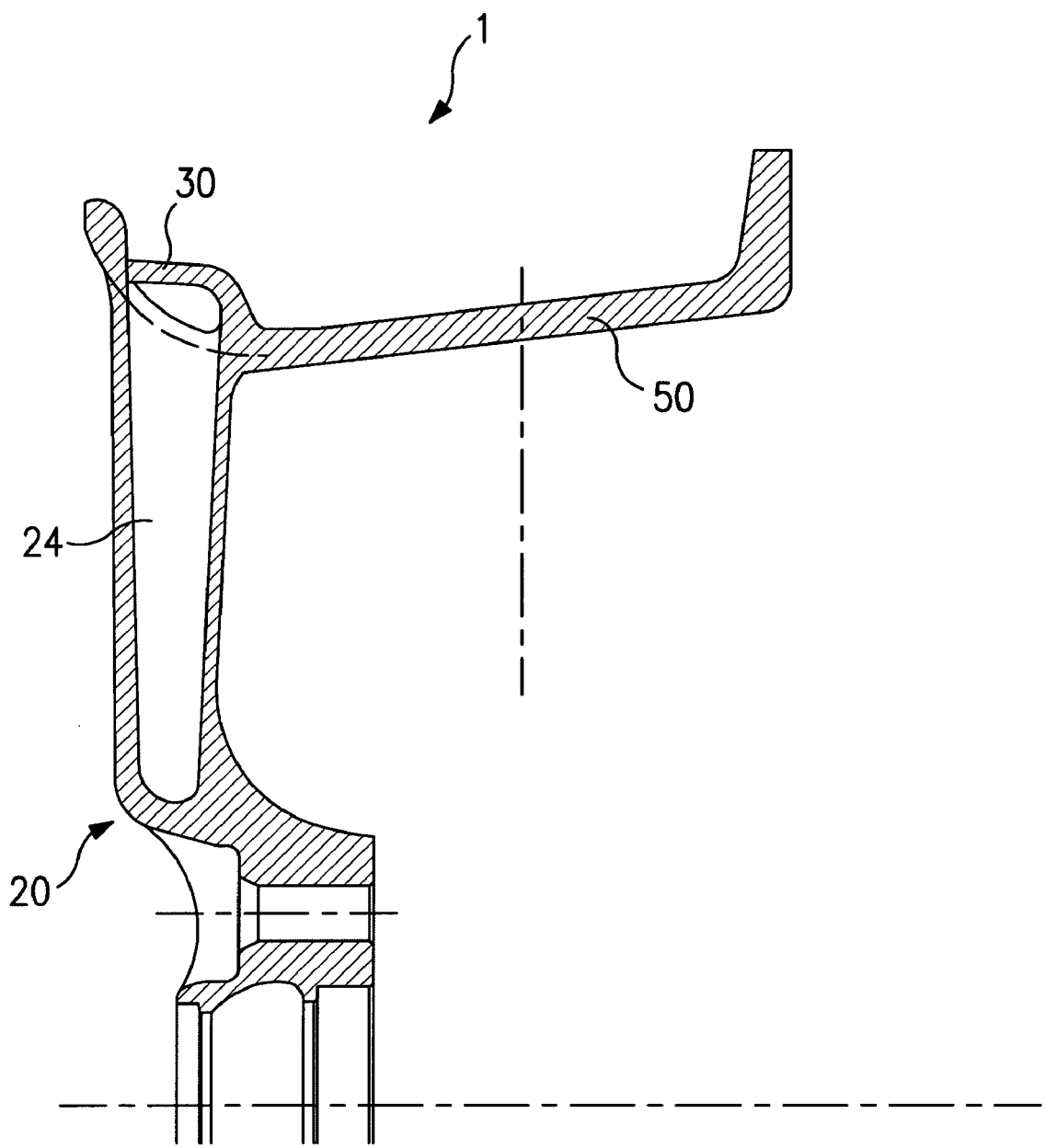
FIG. 7B shows a transitional form.
Figure 7C:
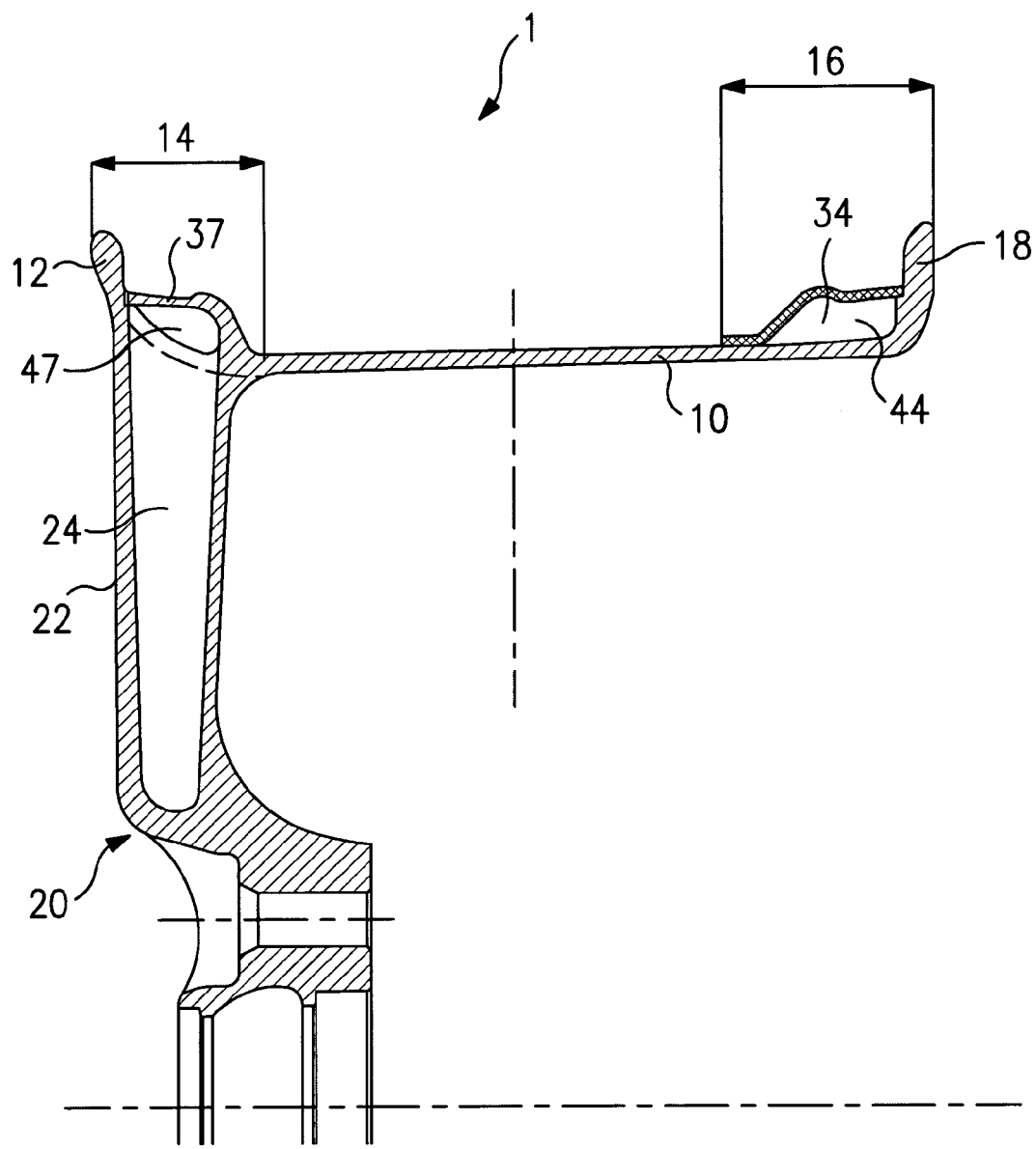
FIG. 7C shows a final form.
Figure 8:
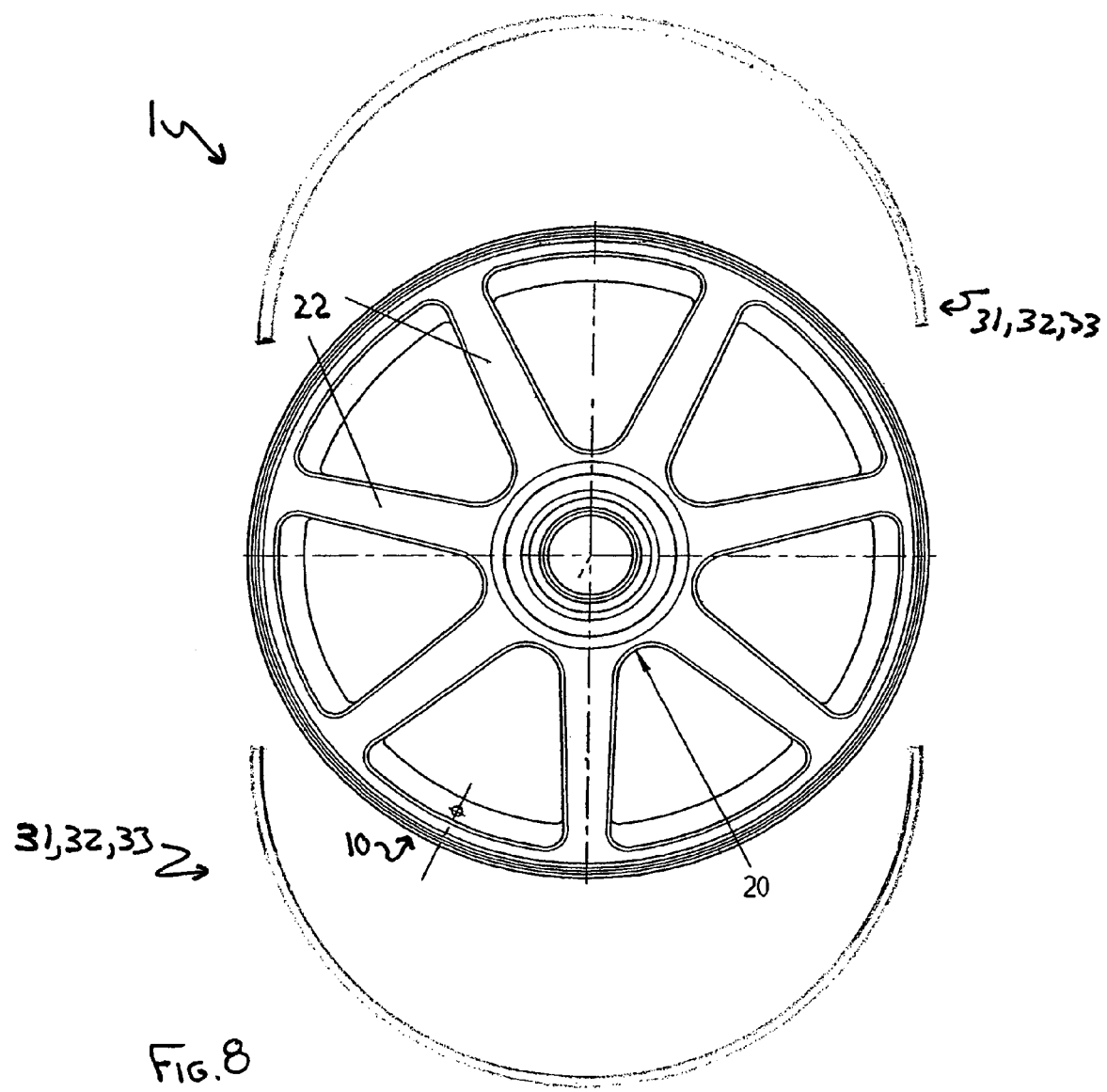
FIG. 8: Wheel in a view from the front.

FIGS. 7A, 7B and 7C depict an additional variant, in which a profile segment (34) in agreement with that of FIG. 4 is used in the area of the internal base of the rim (16). The characteristic feature lies only in the fact that, during the shaping of the wheel (1), a molded blank (50) (see FIGS. 7A, 7B) is used which has, in the in the area of the external base of the rim (14), an annular bar or radially extending flange (30) having a radially outwardly disposed free edge (51) which is, in a cold or hot transformation process, formed into a profile segment (37) and is brought to application on the external horn of the rim (12). In this manner, the profile segment (37) is formed in an integral manner with the wheel (1) without requiring additional components for the realization of the invention. Although not depicted here, a corresponding procedure is also possible in the internal base of the rim (16). The embodiment of FIG. 7C also includes hollow chamber 47.

Although the concept in accordance with the invention is essentially also suitable for wheels of steel, it preferably finds application in light metal standard norm EN 573-3, namely EN AW-AIMg3 or EN AW-AISiIMgMn, are suitable as materials for the profile segments. Both of the last-named materials involve so-called ductile materials, which can be transformed under cold conditions. Furthermore, it is obviously possible to manufacture the wheel and the profile segments from the same material.

Listing of References:

1 Wheel.
10 Wheel rim.
12 External horn of the rim.
14 External base of the rim.
16 Internal base of the rim.
18 Internal horn of the rim.
20 Spoke wheel center.
22 Spoke.
24 Spoke hollow cavity.
30 Annular bar or radially extending flange
31 Profile segment.
32 Profile segment.
33 Profile segment.
34 Profile segment.
35 Profile segment.
36 Profile segment.
37 Profile segment.
41 Hollow chamber.

42 Hollow chamber.
43 Hollow chamber.
44 Hollow chamber.
45 Hollow chamber.
46 Hollow chamber.
47 Hollow chamber.
50 Molded blank.
51 Radially outwardly disposed free edge.

The invention claimed is:

1. A wheel, for motor vehicles, comprising:

spoke wheel portion (20) and a wheel rim (10);

wherein the wheel rim (10) further comprises an internal bead seat (16) and an external bead seat (14) which makes a transition into an internal flange (18) and an external flange (12);

wherein at least one profile segment (31, 32, 33, 34, 35, 36, 37) which continuously forms at least one hollow chamber (41, 42, 43, 44, 45, 46, 47) in the direction of the circumference, at least in sections, is provided proximate the internal bead seat (16) and/or of the external bead seat (14);

and wherein the at least one profile segment (31, 32, 33, 34, 35, 36, 37) is initially configured as a substantially radially extending flange (30) emanating from the wheel rim between the inner and outer flanges, and having a radially outwardly disposed free edge (51), which radially extending flange (30) is reformed to curve back upon the wheel rim with the free edge (51) rejoined to the wheel rim, to define a hollow space therebetween, and further wherein the substantially radially extending flange (30) emanating from the wheel rim between the inner and outer flanges is bent axially outwardly toward a face of the wheel in a single step to define a hollow chamber.

2. A wheel, for motor vehicles, comprising:

spoke wheel portion (20) and a wheel rim (10);

wherein the wheel rim (10) further comprises an internal bead seat (16) and an external bead seat (14) which makes a transition into an internal flange (18) and an external flange (12);

wherein at least one profile segment (31, 32, 33, 34, 35, 36, 37) which continuously forms at least one hollow chamber (41, 42, 43, 44, 45, 46, 47) in the direction of the circumference, at least in sections, is provided proximate the internal bead seat (16) and/or of the external bead seat (14);

and wherein the at least one profile segment (31, 32, 33, 34, 35, 36, 37) is initially configured as a substantially radially extending flange (30) emanating from the wheel rim between the inner and outer flanges, and having a radially outwardly disposed free edge (51), which radially extending flange (30) is reformed to curve back upon the wheel rim with the free edge (51) rejoined to the wheel rim, to define a hollow space therebetween, wherein the internal flange (18) and the external flange (12) each extend radially outwardly of the at least one hollow chamber.

* * * * *